July 3, 1923.
A. E. BAUMAN
RESILIENT WHEEL
Filed Nov. 26, 1921
1,460,783
2 Sheets-Sheet 1
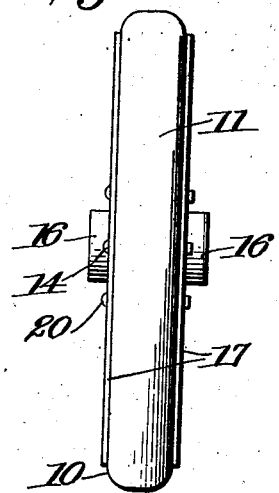
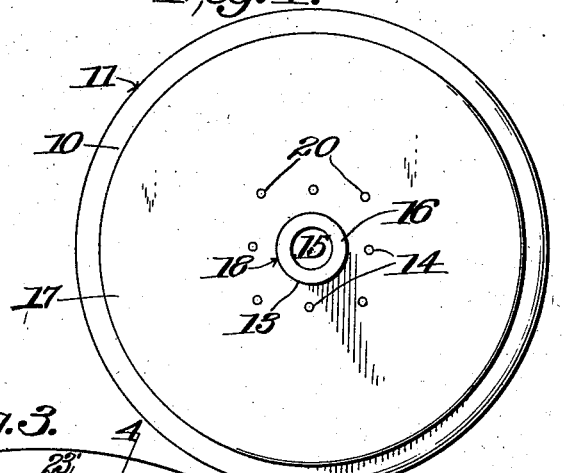
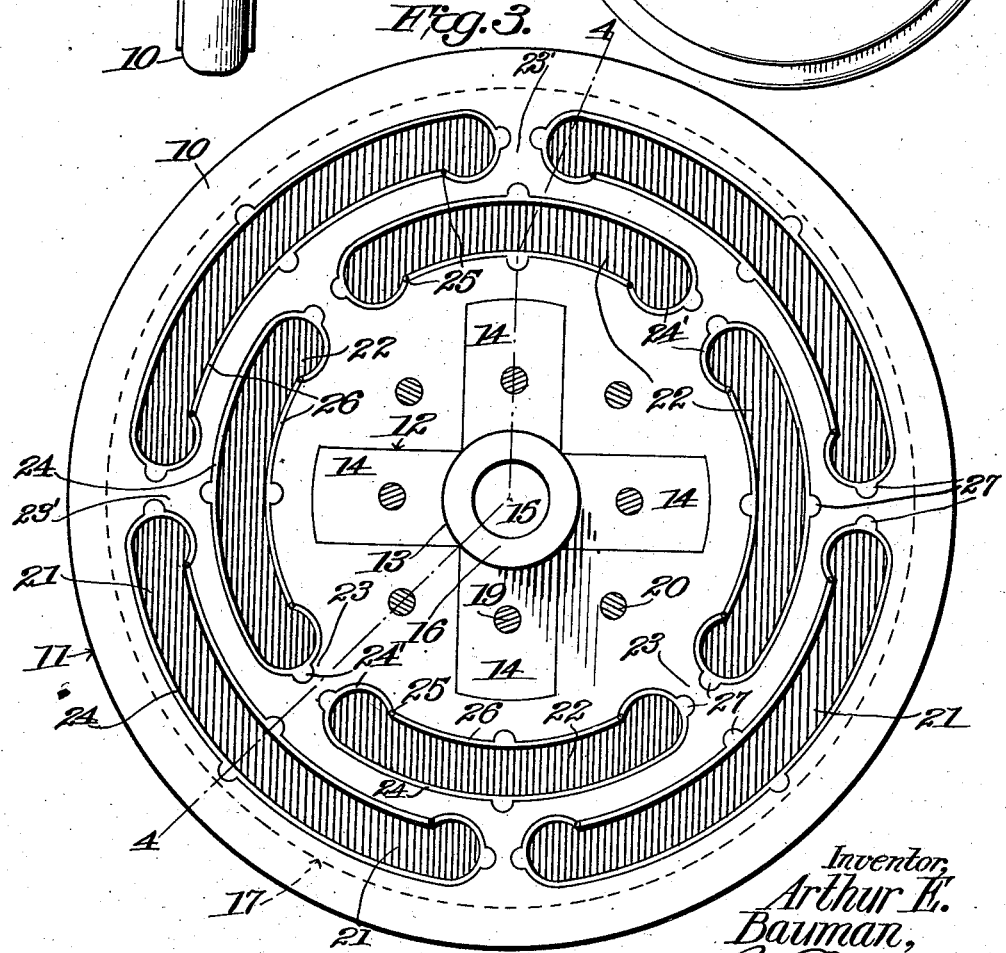
Inventor,
Arthur E. Bauman,
by  Attorney.

July 3, 1923.
A. E. BAUMAN
1,460,783
RESILIENT WHEEL
Filed Nov. 26, 1921
2 Sheets-Sheet 2
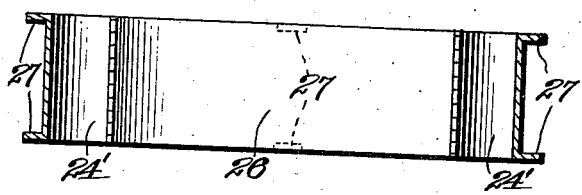
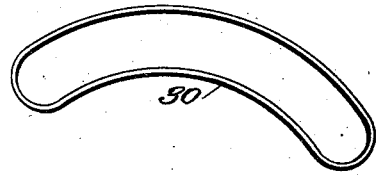
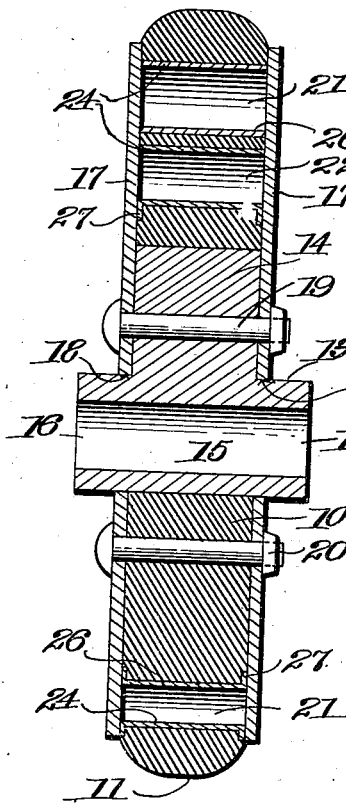
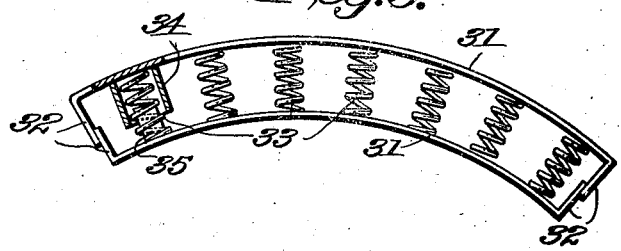
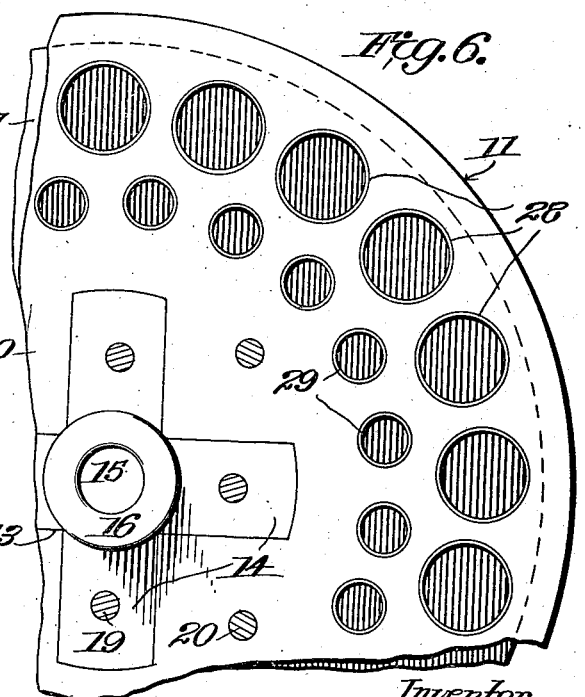
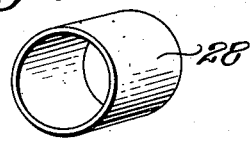
Inventor,
Arthur E. Bauman,
by M. C. Scald,
Attorney.

Patented July 3, 1923.

1,460,783

UNITED STATES PATENT OFFICE.

ARTHUR E. BAUMAN, OF AKRON, OHIO.

RESILIENT WHEEL.

Application filed November 26, 1921. Serial No. 517,928.

*To all whom it may concern:*

Be it known that I, ARTHUR E. BAUMAN, a citizen of the United States, residing at Akron, in the county of Summit and State of Ohio, have invented certain new and useful Improvements in Resilient Wheels, of which the following is a specification.

This invention relates to a resilient wheel for vehicles.

A prime object is to provide a wheel which includes means efficiently substituting the resilient qualities of a pneumatic tire in order to overcome the well-known troubles and objections due to their liability to puncture and "blow-out."

Another important object is to provide a wheel having a body of rubber forming the major part thereof and with resilient metallic devices disposed in recesses provided therethrough.

Still another object is to provide a wheel having said resilient metallic devices arranged in rows or paths concentric with the axis of the wheel and with the devices of the inner row preferably smaller in size and on lines passing radially intermediate the devices of the outer row.

A further object is to provide a wheel having a resilient body provided with endless, open metallic springs with retaining and reinforcing lugs thereon, if preferred, and hingedly connected leaves, if desired.

A still further object is to provide a wheel having a resilient body containing resilient metallic springs, side plates to prevent displacement thereof, a hub for the body mounting the side plates, arms on the hub to reinforce the body and retaining means passing through the plates and arms and through the plates and body.

Additional objects and advantages will appear from a consideration of the description following taken in connection with accompanying drawings illustrating preferred embodiments.

In said drawings:—

Figure 1 is a front elevation of a wheel constructed in accordance with my invention;

Figure 2 is an edge view thereof;

Figure 3 is a side elevation of the wheel on an enlarged scale and with one of the side plates removed to disclose details;

Figure 4 is a cross sectional view on the line 4—4 of Figure 3;

Figure 5 is a central horizontal sectional view through one of the spring devices;

Figure 6 is a fragmentary side elevation, similar to Figure 3, but illustrating the use of a modified form of spring;

Figure 7 is a detail perspective view of one of the springs used in the form of Figure 6;

Figure 8 is a side elevation of a third form of spring which may be used and

Figure 9 is a side elevation, partly broken away, of a fourth form of spring capable of use.

Like reference characters designate like or corresponding parts in the different views where they appear.

In reducing the invention to practice as illustrated in Figures 1 to 5 inclusive, a body 10 consisting of a rather thick elastic disk, as of rubber, is provided and adapted to have traction directly on the ground at its circumference or tread surface 11.

Fitted snugly within a central cruciform or other suitably shaped slot 12 provided transversely of the body 10, is a metallic or other hub structure 13, consisting of arms 14, an axle-bearing opening 15 and extension sleeves 16 about said opening integral with and projecting laterally from arms 14. The number of arms 14 may be varied and if desired, other forms of hub structures may be used.

Side plates 17 are disposed one against each side of body 10 and they have openings 18 for projection of sleeves 16 therethrough in order to position and mount them. The diameter of plates 17 is less than the diameter of the body 10 so that said body will extend beyond said plates and its resilient or yielding action will be unrestricted by the plates.

Transverse bolts or removable fastenings 19 pass through suitable openings in the plates 17 and arms 14 while similar bolts or fastenings at 20 pass through said plates 17 and the body 10 intermediate the arms 14, which particularly reinforces the pointed portions of the body at its core or hub provided incidental to the cutting of the cruciform slot 12.

In a row concentric with the axis of the wheel, a suitable number of slots or recesses 21, adjacent the tread of the body 10, are provided through said body from side to side. A row of recesses concentric with said recesses are provided relatively close thereto, completely through the body and between the recesses 21 and the wheel hub as at 22. It is to be noted that the recesses 21 and 22 are radially disaligned so that the recesses 21 cross radial lines passing through webs 23 between recesses 22, and the recesses 22 cross radial lines passing through webs 23' between recesses 21.

Any suitable type of cushioning springs are disposed in contact with the walls of recesses 21 and 22 to increase the resiliency of the wheel. The springs of Figures 1, 4 and 5 are shown as normally tensioned and made from flexible strip or ribbon metal and comprise substantially arcuate leaves 24 with terminal arcuate hook portions 24', to the free ends of which as at 25, arcuate leaves 26 are suitably pivoted on transverse axes. Said hook ends 24' tend to reinforce and increase the tension of a spring of this type.

Positioning and retaining lugs 27 may optionally be employed on the leaves 24 and 26 to overlap opposite sides of the body 10 and are disposed in correspondingly shaped depressions in said body. The elasticity of said body 10 will enable the springs when equipped with lugs 27 to be inserted and removed.

In use, the tread 11 travels directly on the ground and the wheels at body 10 and the spring leaves 24 and 26 absorb shocks and jars imparted by obstacles encountered in the path of travel and uneven road conditions. The wheel is substantially rigid at the hub or core due to the use of structure 13 and the presence of bolts 19 and 20. Body 10 primarily yields beyond said bolts.

The plates 17 positively prevent transverse displacement of springs 24 and 26 yet offer no resistance to yielding of the body beyond said bolts.

No limitation to the use of the spring devices of Figures 3, 4 and 5 is to be implied as the construction may be varied. For instance, in Figure 6 the springs are cylindrical tubes 28 and 29 and their retaining recesses in body 10 are shaped to correspond. Said springs 28 and 29 are disposed in the paths of concentric circles and springs 29 are smaller than springs 28 and in staggered relation thereto similar to the relation of the springs in the previous figures. The other parts correspond to and have the same reference numerals as in the previous figures applied thereto. One of the tubular springs is detailed in Figure 7.

Referring to Figure 8, another modified form of spring which may be used in the recesses of body 10 is illustrated at 30, being made in a single piece and substantially similar in general shape to the spring of Figure 3, but lacking the hooks 24' and lugs 27.

Still another modified form of cushioning spring is shown in Figure 9. It may have relatively movable arcuate leaves 31 with overlapping end flanges 32. Coil springs 33 resist relative movement of said leaves toward each other. As one means to prevent lateral displacement of leaves 31, one of them has a barrel 34 receiving a spring 33 and a stud 35 extending into the spring from the other leaf. Any desired number of said springs 33 may have barrels 34 and studs 35 associated with them.

Other changes within its spirit and scope may be made in carrying the invention into practice.

I claim:

1. A resilient wheel having a resilient body having substantially transverse recesses, therein, spring means in said recesses, said spring means subtantially throughout their margins intimately contacting with the walls of the recesses, and retaining lugs on said spring means disposed at an angle to said walls and overlapping said body.

2. A resilient wheel having a resilient body, springs in said body having leaves, said leaves having hook ends, and leaves pivoted to said hook ends.

3. A resilient wheel having a resilient body provided with lateral recesses, leaves disposed in said recesses, said leaves being resilient and having hook ends, leaves pivoted to said hook ends, and lugs extending from the leaves to overlap the body.

4. A resilient wheel having a resilient body provided with substantially transverse recesses, springs in said recesses and substantially throughout their margins intimately contacting with the walls of the recesses, a row of springs equal in number to and intermediate said springs and the center of the wheel, said body having second substantially transverse recesses, the springs of said row being disposed in the last mentioned recesses and substantially throughout their margins intimately contacting with the walls of the last mentioned recesses, and the springs of said row crossing radial lines passing intermediate the first mentioned springs.

5. A resilient wheel having a resilient body provided with substantially transverse recesses, springs in certain of said recesses and substantially throughout their margins intimately contacting with the walls of the recesses, a spring intermediate said springs and the center of said body disposed in another of said recesses and substantially throughout its margin intimately contacting with the wall of the last recess and crossing a radial line passing intermediate the first mentioned springs, and the second mentioned spring being of less size in a direction circumferentially of the wheel than the first mentioned springs.

6. A resilient wheel having a resilient body provided with substantially transverse recesses, rows of springs concentric with the center of said body and disposed in said recesses and substantially throughout their margins intimately contacting with the walls thereof, the springs of the innermost row being smaller than the other springs in a direction circumferentially of the body, and the springs of the inner row crossing radial lines passing intermediate the springs of the first mentioned row.

7. A wheel having a disk-like body of rubber, said body having a slot at its center, a hub snugly disposed in said slot, arms extending from said hub, said hub having collars extending laterally beyond the arms, said body having laterally disposed recesses, springs in said recesses having leaves in contact with the walls therein, said leaves being pivoted together, certain of said leaves having hook terminals, lugs extending from said leaves to overlap said body, side plates for and of less diameter than said body, said collars extending through said side plates, bolts passing through said side plates and said arms, and bolts passing through said side plates and said body intermediate said arms.

8. A wheel having a resilient disk-like body provided with a slot at its center, a hub snugly disposed in said slot, arms extending from said hub, said body having laterally disposed recesses, springs in said recesses substantially throughout their length intimately contacting with the walls of the recesses, side plates for and of less diameter than said body extending from said hub independent of and overlapping said springs and means to secure said side plates and said hub together.

9. A wheel having a resilient disk-like body provided with a slot at its center, a hub snugly disposed in said slot, arms extending from said hub, said hub having laterally extending collars, said body having laterally disposed recesses, springs in said recesses substantially throughout their length intimately contacting with the walls of the recesses, side plates for and of less diameter than said body, said side plates having openings occupied by said collars, said side plates being independent of and overlapping said springs, and means to secure said plates and hub together.

In testimony whereof I affix my signature.

ARTHUR E. BAUMAN.